United States Patent [19]

Lazenby

[11] Patent Number: 4,798,510

[45] Date of Patent: Jan. 17, 1989

[54] CONCRETE BUCKET ASSEMBLY RIGIDLY MOUNTED FOR VERTICAL TILTING AND ROTATIONAL MOVEMENT TO A FORKLIFT VEHICLE

[76] Inventor: James E. Lazenby, 808 Daisy St., Monroeville, Ala. 36461

[21] Appl. No.: 143,749

[22] Filed: Jan. 14, 1988

[51] Int. Cl.[4] .......... B65G 69/00

[52] U.S. Cl. .......... 414/607; 239/661; 239/664; 222/168; 414/326; 414/526; 414/642

[58] Field of Search .......... 414/607, 608, 629, 632, 414/637, 641, 642, 414, 326, 526; 222/168; 239/650, 661, 663, 664, 149

[56] References Cited

U.S. PATENT DOCUMENTS 3,512,670 5/1970 Howard .......... 414/607

4,144,981 3/1979 Borgen .......... 414/607

4,561,822 12/1985 Schmook .......... 414/607 X

*Primary Examiner*—Frank E. Werner

*Attorney, Agent, or Firm*—C. A. Phillips

[57] ABSTRACT

A concrete bucket assembly which is rigidly mounted for vertical, tilting, and rotational movement to a forklift vehicle. The concrete bucket is provided with upper and lower ball and socket assemblies. The lower ball and socket assembly secures the bucket to the extending fork of the vertically movable frame of the forklift truck. The upper ball and socket assembly secures the bucket, at the top thereof, to an arm which extends from and is pivotally secured to the vertically movable frame of the forklift vehicle. The hydraulic system of the vehicle is used to move a closure member at the funnel-shaped bottom of the bucket and to also control movement of a chute at the bottom of the bucket.

11 Claims, 3 Drawing Sheets

CONCRETE BUCKET ASSEMBLY RIGIDLY MOUNTED FOR VERTICAL TILTING AND ROTATIONAL MOVEMENT TO A FORKLIFT VEHICLE

TECHNICAL FIELD

This invention relates generally to a concrete bucket for holding and dispensing concrete mixtures at a manufacturing site. More particularly, the invention relates to such a concrete bucket which is releasably, rigidly, and rotatably mounted to a lifting arm of a conventional forklift truck.

BACKGROUND OF THE INVENTION

At some manufacturing plants it is necessary to pour precast concrete from large hoppers or concrete buckets. Typically the buckets include a large upper opening into which concrete is poured and a lower funnel-like exit section for emptying the concrete into an adjacent chute where it is directed to the desired location. The buckets are normally of rugged steel construction and are very heavy. Sturdy equipment is needed to lift and transport the bucket or hopper to the precise desired location at the production line. Some buckets or hoppers are provided with lifting members across the top thereof which are grasped by a hook on the end of a cable, and the cable is generally secured to a large crane which serves to lift the bucket or hopper to the desired elevation after the bucket has been transported to the construction site by trucks. Since the bucket is suspended by a cable extending downwardly from the lifting apparatus (crane), there is no rigid connection between the lifting apparatus and the very heavy bucket. Generally, on some such buckets, a large gate mechanism disposed at the bottom of the funnel of the bucket must be manually opened to discharge the concrete mixture through a chute which must be manually placed at the desired position.

Another type of hopper is provided with a pair of spaced lifting members at the bottom thereof into which a pair of lifting forks of a vehicle are inserted to lift the hopper for transportation to the desired location at the plant site where the concrete is dumped by using the block truck swinging boom. This unit will discharge straight forward only.

Still another type of concrete bucket support and dispensing apparatus is a very large wheeled vehicle (Tuckerbilt) which has the bucket rigidly mounted directly on the rotatable bed of the vehicle. A very long chute extends from the bucket and passes under the operator who sits in a raised cabin supported on the rotatable bed to control the positioning of the chute. The bucket will tilt but is not designed to be moved vertically. To lift the bucket vertically, it would be necessary for a heavy duty crane to lift the complete vehicle and bucket (approximately 12,500 pounds—empty).

None of the above mechanisms provide for the releasable rigid attachment of a concrete hopper to a vehicle while permitting the hopper to be vertically moved, tilted, and rotated on the vehicle to permit the concrete to be easily dumped at a precise desired location at a production site.

It is an object of the present invention to provide a concrete bucket assembly in which the bucket is releasably, rigidly, and rotatably attached to the lifting fork of a forklift truck.

It is a further object of the present invention to provide such a concrete bucket with a closure member and a trough which are operated by the hydraulic system of the forklift truck.

SUMMARY OF THE INVENTION

A concrete bucket assembly which is rigidly and rotatably secured to a vehicle having a lifting fork thereon which is disposed for vertical and tilting movement. The bucket assembly is secured at the bottom thereof to the lifting fork by a ball and socket connection. A second ball and socket connection is provided between the upper section of the bucket and an arm pivotally secured to and extending from the lifting assembly of the vehicle and above the upper section of the bucket. An actuating assembly carried on the vehicle operates a closure mechanism at the base of the bucket and also tilts the chute.

DESCRIPTION OF THE PREFERRED EMBODIMENT

Figure 5:
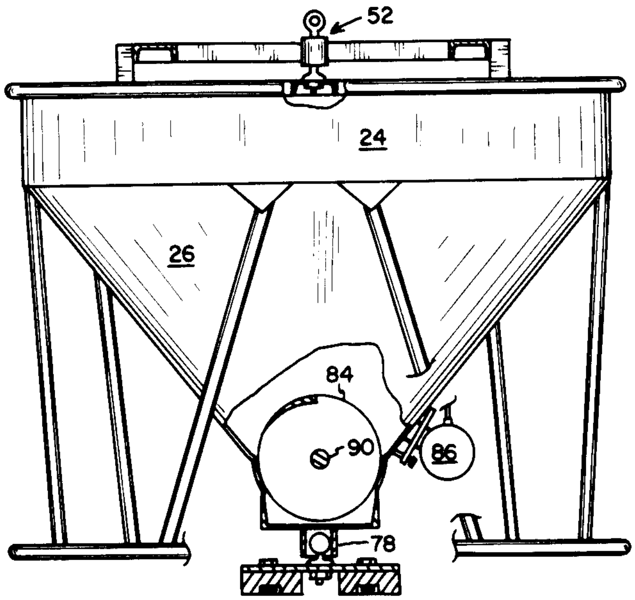
FIG. 5 is an elevational view, partially broken away, taken along line 5—5 of FIG. 4.
Figure 1:
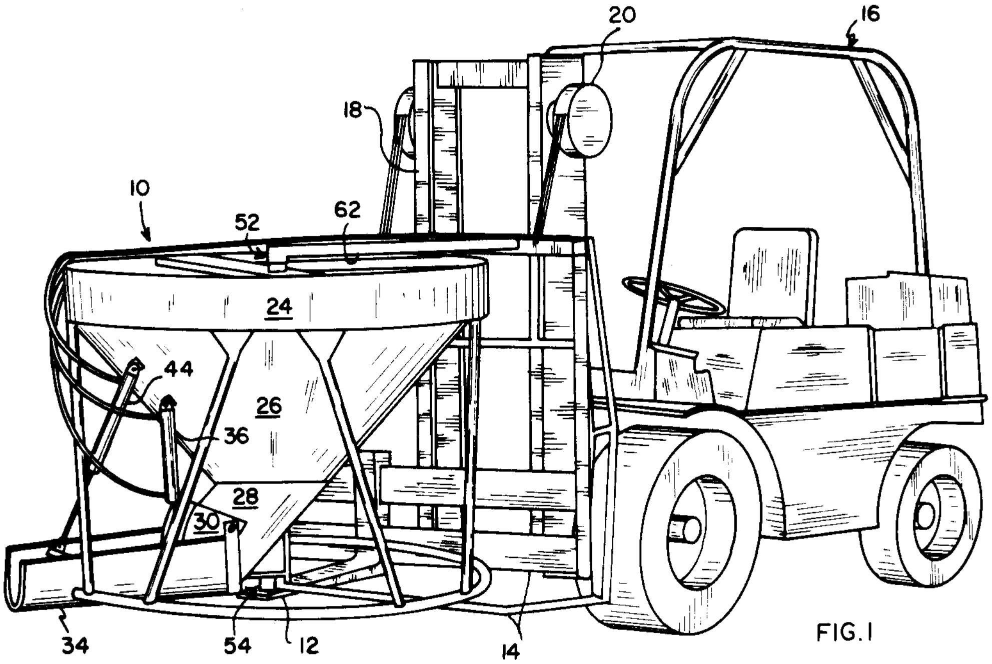
FIG. 1 is a pictorial view of a forklift truck having the concrete bucket of the present invention secured thereon.

As seen in FIG. 1, a concrete bucket assembly 10 is secured to an extending arm 12 of a frame 14 of a forklift truck 16. Frame 14 is vertically movable in tracks 18 of the forklift truck by the hydraulic system of the forklift. A reel 20 (only one shown) is mounted on each side of the frame of the forklift truck to reel in and pay out the hydraulic lines of the hydraulic system.

Figure 2:
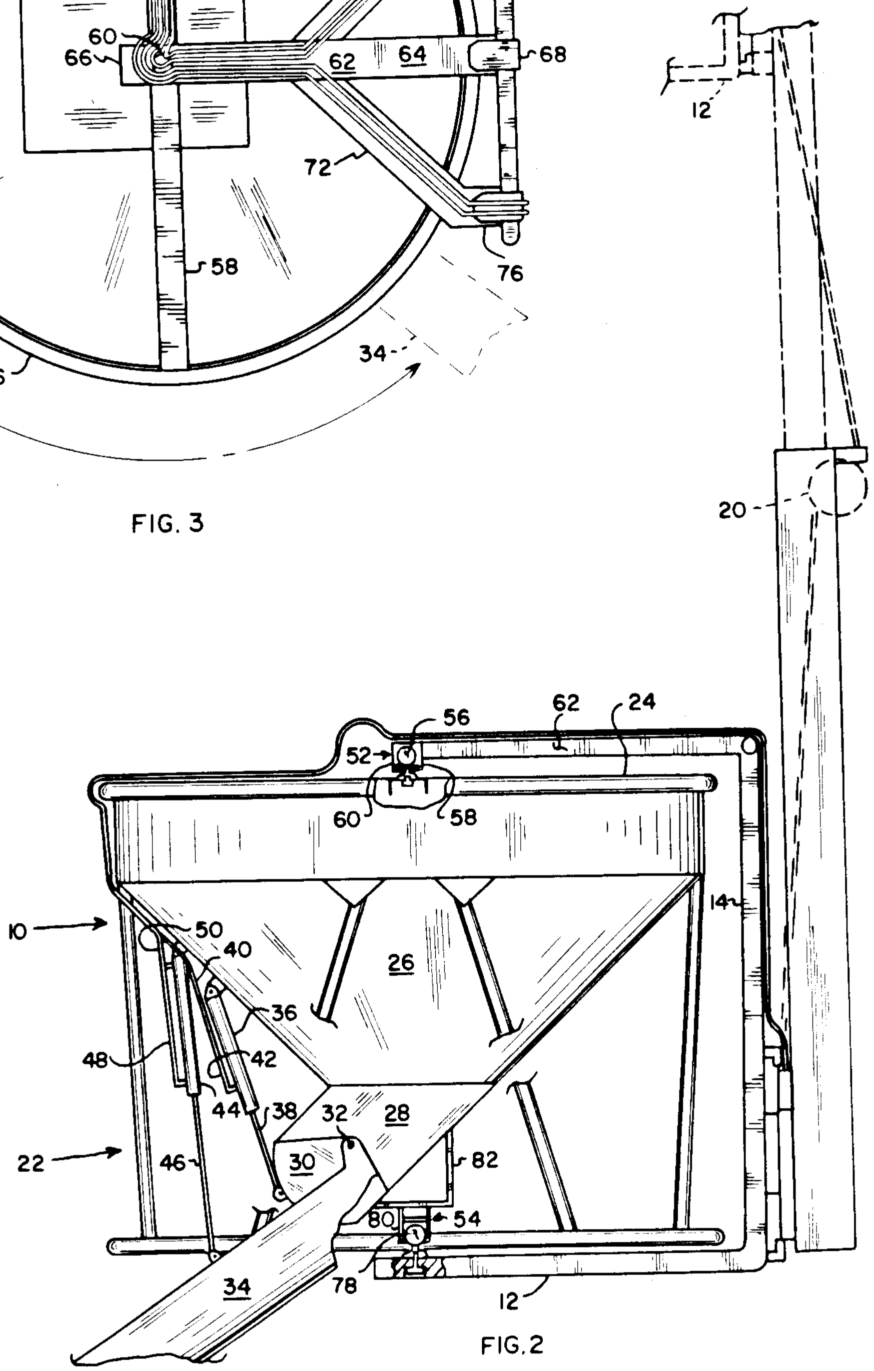
FIG. 2 is an elevational side view, partially in section, illustrating the concrete bucket and the ball and socket attachment means for rigidly and rotatably securing the bucket to a lifting arm of a forklift truck. The mast of the forklift is shown (in phantom lines) in an extended position.

As seen in FIG. 2, concrete bucket assembly 10 includes a bucket 22 having an open upper section 24, a central cone section 26, and a lower funneled section 28. A closure member 30 is pivotally secured at pivot pin 32 to lower funneled section 28, and a trough or chute 34 is also pivotally secured to funneled section 28 by pin 32. The pin extends through both sides of the funneled section to support closure member 30 and chute 34 on opposite sides of the funneled section. The chute may include "add on" sections which are added to increase the length of the chute. A first hydraulic cylinder 36 is pivotally secured to cone section 26, and a piston rod 38 extends from a piston in the cylinder and is pivotally secured to closure member 30. Hydraulic lines 40 and 42 extend from cylinder 36 to reel 20 and then to the hydraulic control and supply system of the forklift. A second hydraulic cylinder 44 is pivotally secured to cone section 26, and a piston rod 46 extends from a piston in cylinder 44 and is pivotally secured to chute 34. Hydraulic lines 48 and 50 extend from cylinder 44 to reel 20 and then to the hydraulic control and supply system of the forklift. FIG. 2 shows the hydraulic lines payed out from the reel as the mast is extended.

Figure 3:
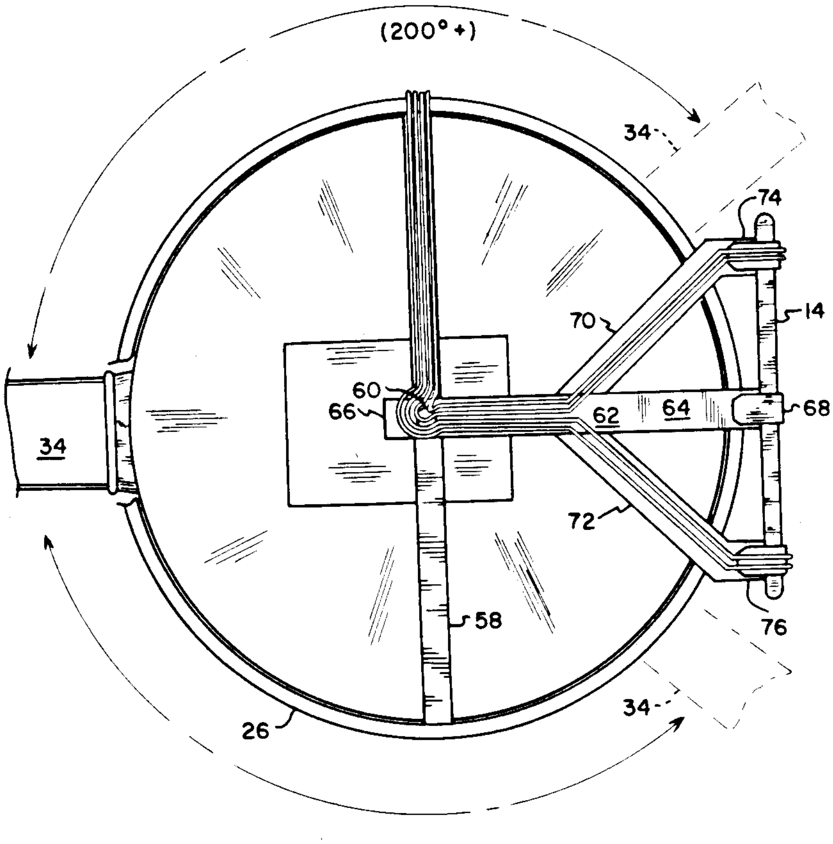
FIG. 3 is a plan view of the concrete bucket of FIG. 2.

To rigidly and rotatably secure the bucket to the forklift, a pair of ball and socket assemblies 52 and 54 are provided at the top and bottom, respectively, of bucket 22. Ball and socket assembly 52 includes a ball 56 which is secured to a cross bar 58 secured to the upper sides of bucket 22 and extending across open section 24 thereof. Socket 60 of ball and socket assembly 52 is secured to a support arm assembly 62 which is pivotally secured to frame 14 of the forklift and extends partially across the opening of upper section 24 of bucket 22 for snug fitting engagement of the ball and socket assembly. As seen in FIG. 3, support arm assembly 62 includes a central arm 64 having socket 60 secured at one end 66 thereof. The other end 68 of arm 64 is pivotally secured to frame 14 of the forklift. A pair of angled support arms 70 and 72 are rigidly secured to and extends from central arm 64 for pivotal connection to frame 14 at the ends 74 and 76 thereof.

Lower ball and socket assembly 54 includes ball 78 which is secured to arm 12 and a socket 80 which is secured to a support frame 82 which is secured to the bottom of funelled section 28 of bucket 22.

Figure 4:
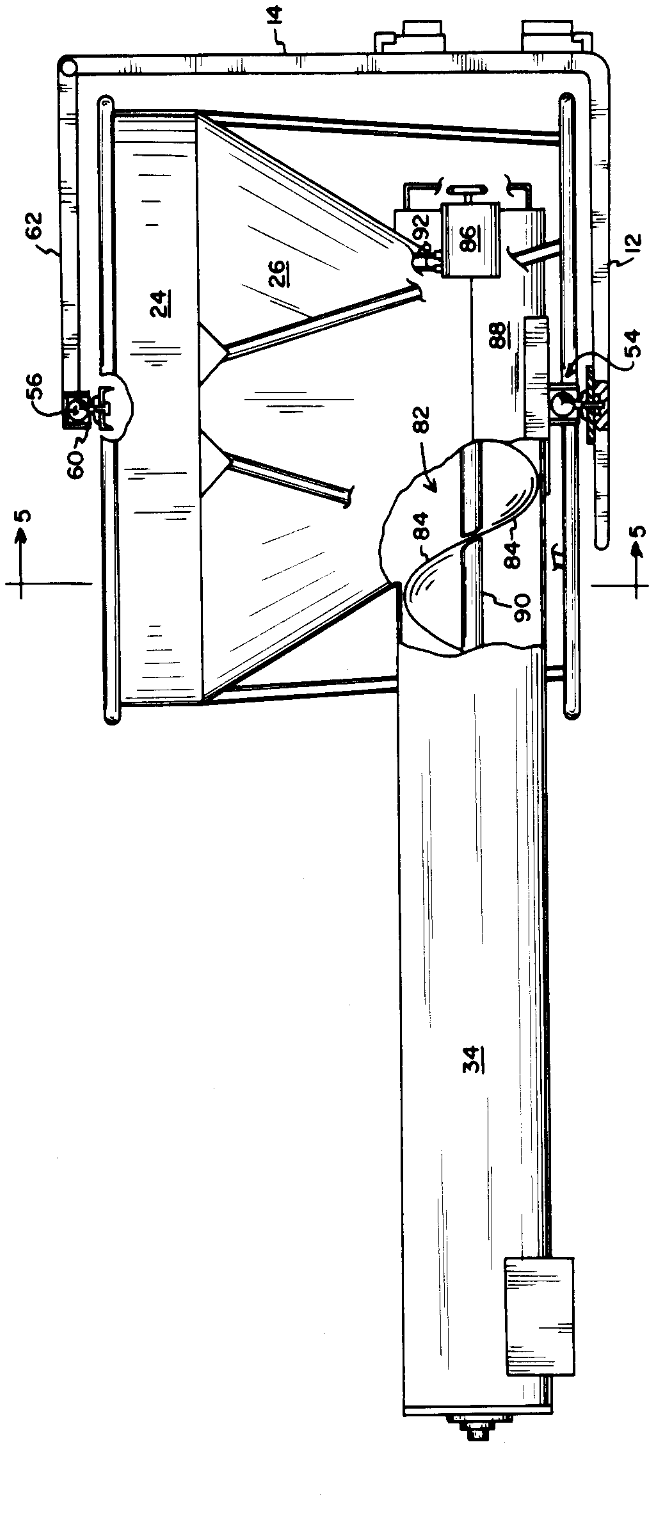
FIG. 4 is an elevational side view similar to FIG. 1 illustrating an auger assembly for discharging the concrete mixture.

FIGS. 2 and 3 illustrate the manner in which the hydraulic lines are routed to piston cylinders 36 and 48 of closure member 30 and chute 34. As seen in FIGS. 1 and 3, the hydraulic lines extend from the cab of the forklift truck and to reels 20 mounted on frame 14. The lines are payed out or reeled on reels 20 as frame 14 is raised or lowered. In any event, the hydraulic lines are routed over arm 64 to cross members 58 and downwardly to closure member 30 and chute 34 in the case of a side discharge as seen in FIG. 4. In the case of a forward discharge, arm 58 is secured to the upper section at a 90° angle from that shown in FIG. 4 and runs under arm 64 of support arm assembly 62 and extends to the edge of the bucket. FIG. 4 also illustrates the rotational capabilities of the bucket assembly. As can be seen, the assembly is capable of rotating through 200+ degrees while being rigidly secured to the forklift truck by the ball and socket mounting structure.

As seen in FIG. 4, trough 34 has been extended to house an auger 82. The blades 84 of the auger serve to direct the cement from the bucket through the chute or trough and also serve to act as a closure member at the very bottom of the funneled section. The blades retain the cement in the bucket when the auger is not operating. The trough is rigidly mounted and the length thereof is fixed; however, an elephant trunk (flexible sleeve) can be attached to the discharge for special cases. The discharge height is only limited by the working height of the forklift truck. A hydraulic motor 86 is mounted at the rear 88 of trough 34 to rotate the auger blade shaft 90. Motor 86 is connected by hydraulic lines 92 to the hydraulic system of the forklift.

It should be readily seen that the applicant has provided a concrete bucket assembly with a ball and socket mounting structure which permits vertical tilting and rotational movement (200+ degrees) of the concrete bucket assembly. A distinct advantage is provided by the concrete bucket assembly of the present invention in production areas where forms of varying sizes and heights are placed side by side with work or service aisles in between. The applicant's structure allows the servicing of both sides of the aisles while accomplishing horizontal, vertical, and rotational movements, which are not available with straight discharges.

I claim:

1. A concrete bucket assembly disposed for vertical and rotational movement comprising:

a lifting apparatus having support means thereon disposed for vertical and tilting movement;

a concrete bucket having an upper open portion to receive a concrete mixture therein and a lower funneled portion for discharging said concrete mixture;

closure means operable for retaining and directing said mixture into and out of said bucket;

actuating means carried by said lifting apparatus and disposed for actuating said support means for the vertical and tilting movement thereof and for actuating said closure means for opening and closing thereof; and ball and socket means carried by said bucket and said support means and disposed in substantially axial alignment at said upper and lower portions of said bucket to permit rotational movement thereof.

2. An assembly as set forth in claim 1 wherein said support means includes lower and upper arms horizontally extending from said lifting apparatus in spaced relation, and said upper open portion of said bucket is provided with a member extending thereacross, said ball and socket means including a first ball and socket assembly secured between said lower arm and said bottom portion of said bucket and a second ball and socket assembly secured between said upper arm and said member.

3. An assembly as set forth in claim 2 wherein said lower portion of said bucket is provided with a flanged member extending therefrom, said flanged member having the socket member of said first ball and socket assembly secured thereto, the ball of said socket being secured to said lower arm.

4. An assembly as set forth in claim 3 wherein said upper arm is removably and pivotally secured to said lifting apparatus, said upper arm having the socket of said second ball and socket assembly secured thereto, the ball of said second ball and socket assembly being secured to said member extending across said upper opening.

5. An assembly as set forth in claim 4 including a chute member secured to said bottom portion of said bucket in communication with said funneled portion thereof.

6. An assembly as set forth in claim 5 wherein said closure member is an arcuate cover member rotatably secured adjacent to the bottom of said lower funneled portion of said bucket and operably connected to said actuation means for pivotal movement.

7. An assembly as set forth in claim 6 wherein said lifting apparatus is a forklift truck and said actuation means are operated by the hydraulic control system of said forklift truck.

8. An assembly as set forth in claim 5 wherein said chute member is pivotally secured to the bottom portion of said bucket and operably connected to actuation means for pivoting said chute member in a vertical plane.

9. An assembly as set forth in claim 5 including an auger disposed in said chute member, said auger having the blades thereof displaced in snug fitting relation with the interior surfaces of said chute member whereby said auger blades serve to define said closure means, and means for rotating said auger.

10. An assembly as set forth in claim 9 wherein said chute member includes an open end and a closed end, said means for rotating said auger is a hydraulic motor connected to said actuating means carried by said lifting apparatus.

11. An assembly as set forth in claim 10 wherein said lifting apparatus is a forklift truck and said actuation menas are operated by the hydraulic control system of said forklift truck.

* * * * *